United States Patent Office 3,223,702
Patented Dec. 14, 1965

3,223,702
3,19-LACTONES OF 3β-HYDROXY-19-OIC ACIDS OF THE ANDROSTANE AND PREGNANE SERIES
Albert Bowers, Mexico City, Mexico, assignor to Syntex Corporation, Panama, Panama, a corporation of Panama
No Drawing. Filed June 17, 1963, Ser. No. 288,496
15 Claims. (Cl. 260—239.57)

The present invention relates to novel cyclopentanophenanthrene derivatives and to a process for the production thereof.

More particularly the present invention relates to novel 3,19-lactones of 3β-hydroxy-19-oic acids of the androstane and pregnane series.

The novel compounds of the present invention are represented by the following formulae:

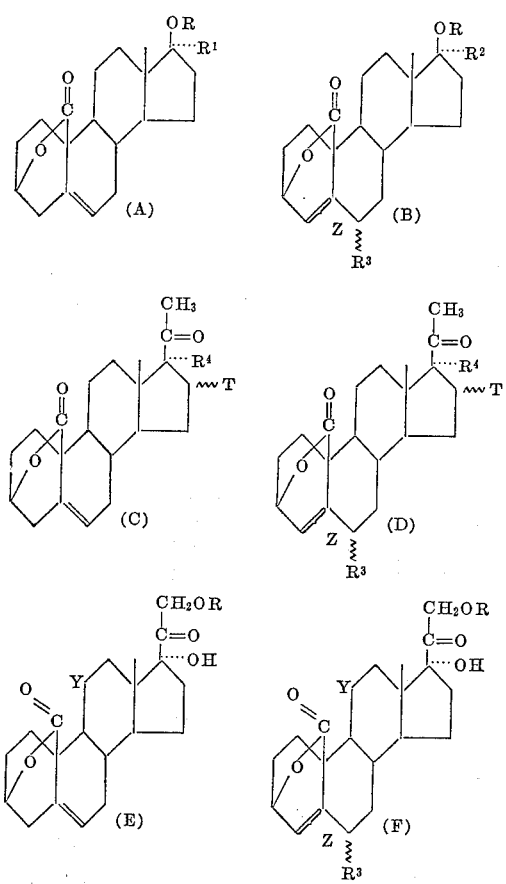

In the above formulae R represents hydrogen or a hydrocarbon carboxylic acyl group of less than 12 carbon atoms; $R^1$ represents hydrogen, lower alkyl, lower alkenyl or lower alkinyl; $R^2$ represents hydrogen or lower alkyl; $R^3$ represents a hydroxyl or a keto group; $R^4$ represents hydrogen, hydroxyl or a hydrocarbon carboxylic acyloxy group of less than 12 carbon atoms; T represents hydrogen, α or β methyl, or α-hydroxyl; $R^4$ and T together represent the group

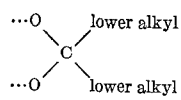

in the 16α,17α-position; Z represents a double bond or a saturated linkage, each between C–4 and C–5; Y represents β-hydroxyl or a keto group; when $R^3$ is hydroxyl, Y is preferably β-hydroxyl; and when $R^3$ is keto, Y is preferably keto.

The acyl and acyloxy groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by Formulae A and B are anabolic-androgenic agents with a favorable anabolic-androgenic ratio. In addition, they have anti-estrogenic, anti-gonadotropic, anti-fibrillatory and appetite stimulating properties. Furthermore, they lower the blood cholesterol level, relieve premenstrual tension and suppress the output of the pituitary gland.

The compounds represented by Formulae C and D are powerful progestational agents with good oral activity. In addition they have anti-androgenic, anti-gonadotropic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The compounds represented by Formulae E and F are valuable cortical hormones with high anti-inflammatory, low catabolic, glycogenic and thymolytic activities. In addition, they are anti-androgenic, anti-gonadotropic and anti-estrogenic hormones. Furthermore, they have high topical activity in skin disorders such as psoriasis, allergic dermatitis and the like.

The novel androstane derivatives of the present invention are prepared by the process depicted as follows:

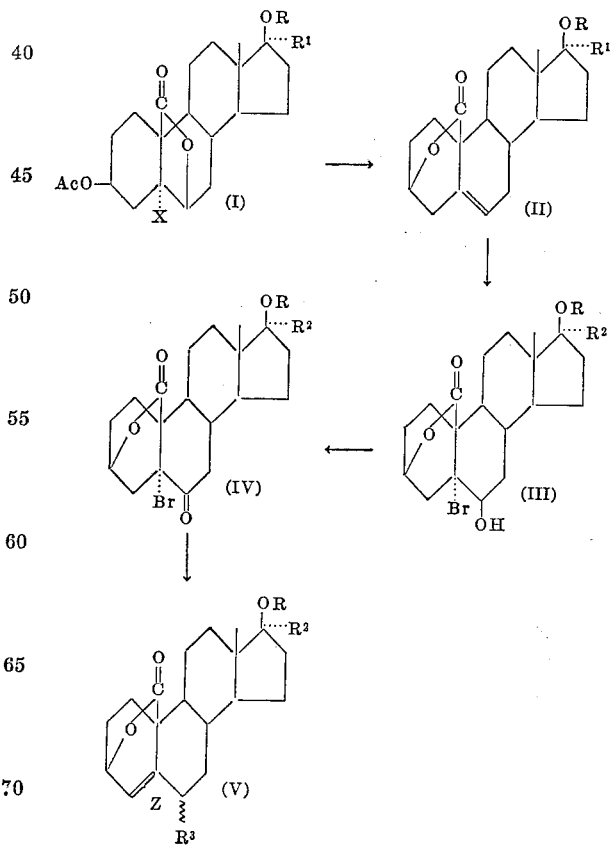

In the above formulae R, $R^1$, $R^2$, $R^3$ and Z have the same meaning as previously defined; X represents chlorine or bromine.

In practicing the process outlined above, the starting 6,19-lactone of 3β-acetoxy-5α-(bromo or chloro)androstane-6β,17β-diol-19-oic acid derivative (I), which may or may not have a substitution at C–17α and which has a free or esterified hydroxyl at C–17β, is treated with zinc and calcium carbonate in a high boiling point solvent, such as ethylene glycol, preferably at reflux temperature for a period of time of the order of 3 hours, thus giving the corresponding 3,19-lactone of Δ⁵-androstene-3β,17β-diol-19-oic acid derivative (II).

The secondary hydroxyl groups which may be present in the latter 3,19-lactone compound (II) are protected by conventional esterification. The secondary ester, or free tertiary alcohol (II), preferably when $R^1$ is hydrogen or lower alkyl, is treated with N-bromoacetamide in the presence of perchloric acid, preferably in the dark at around 15° C. for approximately 1 hour, and at room temperature, for approximately 1 hour further, thus giving the corresponding 5α-bromo-6β-hydroxy derivative (III), which upon conventional oxidation, e.g., with Jones' reagent, yields the corresponding 5α-bromo-6-keto compound (IV). The latter steroid is dehydrobrominated by the action of boiling pyridine for about 6 hours, thus yielding the corresponding Δ⁴-6-keto compound (V; Z=double bond, $R^3$=keto), which upon conventional hydrogenation in the presence of a suitable catalyst, such as 5% palladium on charcoal yields the corresponding 3,19-lactone of androstane-3β,17β-diol-6-one-19-oic acid derivative (V; Z=saturated linkage, $R^3$=keto).

The above 6-keto derivatives (V; $R^3$=keto) are reduced, preferably with a double metal hydride, such as sodium borohydride, to give predominantly the corresponding 6β-alcohols (V; R=6β-hydroxy) and in smaller amounts the corresponding 6α-alcohols (V; $R^3$=6α-hydroxy).

The novel 21-desoxy pregnane derivatives of the present invention are prepared by the process exemplified by the following equation:

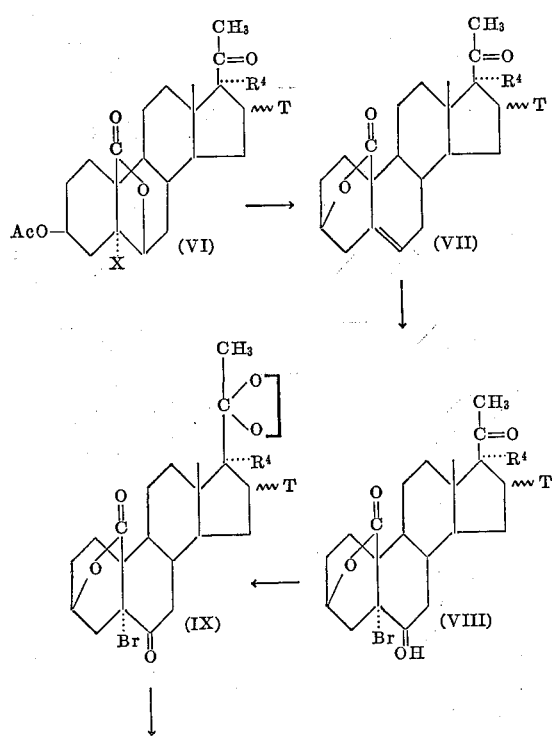

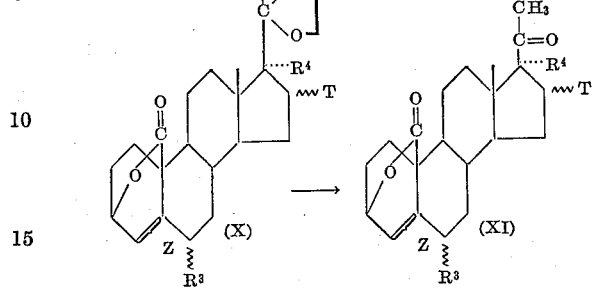

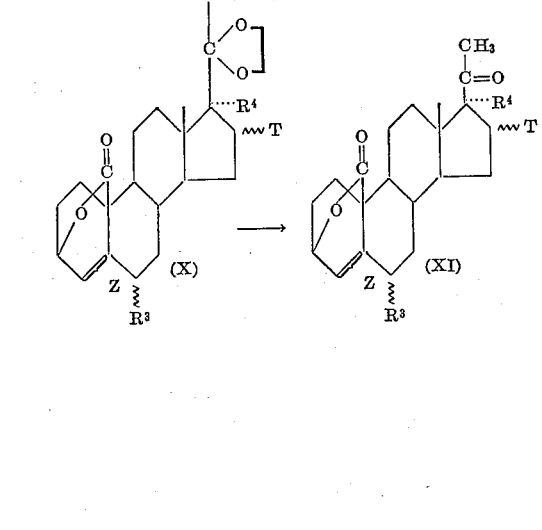

In the above formulae $R^3$, $R^4$, T, X and Z have the same meaning as set forth hereinbefore.

In accordance with the above equation, the starting 3β-acetoxy-5α-(bromo or chloro)-pregnan-6β-ol-20-one-19-oic acid 6,19-lactone derivative (VI) is treated with zinc and calcium carbonate in a high boiling point solvent, such as ethylene glycol, preferably at reflux temperature for a period of time of the order of 3 hours, thus giving the corresponding 3,19-lactone of Δ⁵-pregnen-3β-ol-20-one-19-oic acid derivative (VII).

The secondary hydroxyl groups which may be present in the latter 3,19-lactone compound are protected by conventional esterification and the (protected secondary alcohol) derivative or free (des-secondary hydroxy) compound is treated with N-bromoacetamide in the presence of perchloric acid, preferably in the dark at around 15° C. for approximately 1 hour, and at room temperature, for approximately 1 hour further, thus giving the corresponding 5α-bromo-6β-hydroxy derivative (VIII). The latter compound (VIII) is treated conventionally with ethylene glycol in the presence of p-toluenesulfonic acid, to give the corresponding 20-cycloethylene ketal, which upon conventional oxidation, e.g., with Jones' reagent yields the corresponding 5α-bromo-6-keto-20-ketal compound (IX). The latter steroid is dehydrobrominated by the action of boiling pyridine for about 6 hours, thus yielding the corresponding Δ⁴-6-keto compound (X; Z=double bond, $R^3$=keto) which upon conventional hydrogenation in the presence of a suitable catalyst, such as 5% palladium on charcoal yields the corresponding allopregnane derivative (X; Z=saturated linkage, $R^3$=keto).

The above 6-keto derivatives (X; $R^3$=keto) are reduced preferably with a double metal hydride, such as sodium borohydride, to give predominantly the corresponding 6β-alcohols (X; $R^3$=6β-hydroxy) and in smaller amounts the corresponding 6α-alcohols (X; $R^3$=6α-hydroxy).

The 20-cycloethylenedioxy group of the above compounds is conventionally hydrolyzed in an acid medium, such as aqueous sulfuric acid-methanol to give the corresponding 20-free ketones (XI).

The compounds set forth hereinbefore having a 16α,17α-ketonide grouping, yield the corresponding 16α,17α-diols by conventional treatment with an acid, such as formic acid.

The novel cortical side chain compounds of the present invention are prepared by the process illustrated by the following scheme:

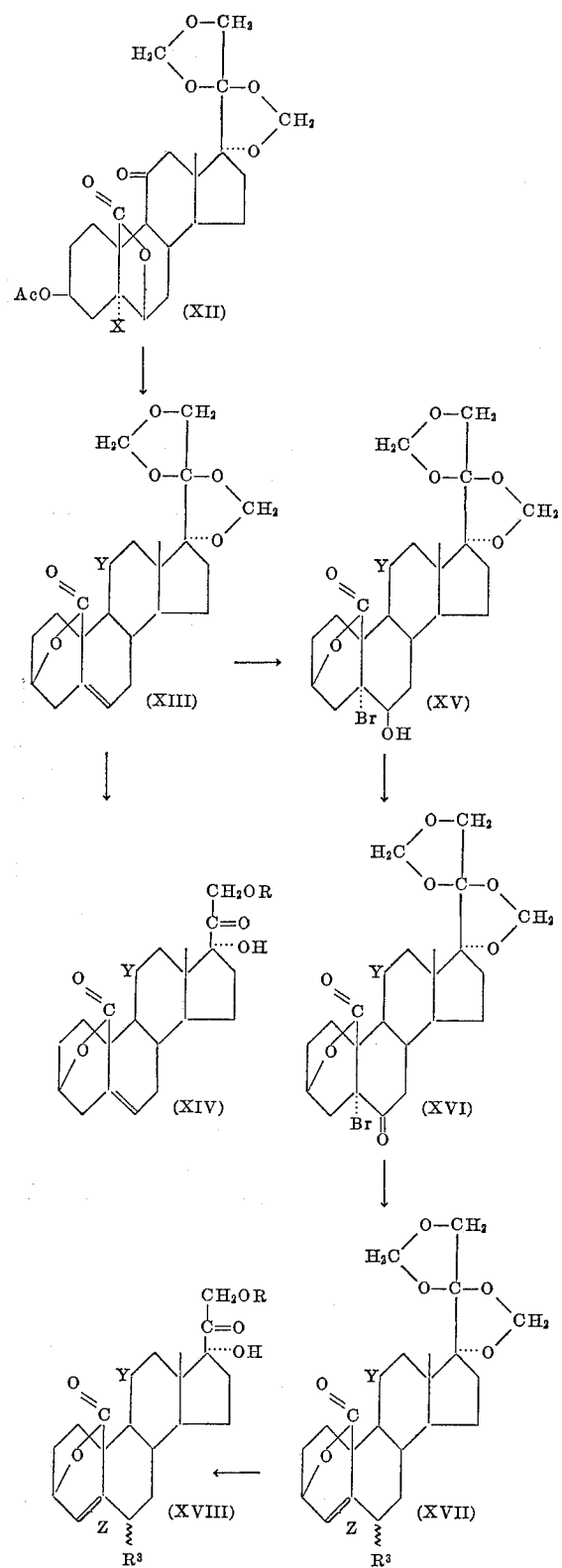

In the above formulae R, R³, X, Y and Z have the same meaning as set forth hereinbefore.

In carrying out the process just outlined, the starting 6,19-lactone of 3β-acetoxy - 17,20;20,21-bismethylenedioxy-5α-(bromo or chloro) - pregnan-6β-ol-11-one-19-oic acid (XII) is treated with zinc and calcium carbonate in a high-boiling point solvent, such as ethylene glycol, preferably at reflux temperature for a period of time of the order of 3 hours, thus giving the corresponding 3,19-lactone of Δ⁵-3β-ol-19-oic acid (XIII). The latter lactone is treated with N-bromo acetamide in the presence of perchloric acid, preferably in the dark at around 15° C. for approximately 1 hour, and at room temperature, for one additional hour, thus giving the corresponding 5α-bromo-6β-hydroxy derivative (XV), which upon conventional oxidation, e.g., with Jones' reagent, yields the corresponding 5α-bromo-6-keto compound (XVI). The latter steroid is dehydrobrominated by treatment with pyridine, at reflux temperature for approximately 6 hours, thus yielding the corresponding Δ⁴-6-keto compound (XVII; Z=double bond, R³=keto), which upon conventional hydrogenation in the presence of a suitable catalyst, such as 5% palladium on charcoal yields the corresponding (3,19-lactone of allopregnan-3β-ol-6-one-19-oic acid) derivative (XVII); Z=saturated linkage, R³=keto).

The above 6,11-diketo derivatives (XVII; Y=R³ =keto) are reduced preferably with a double metal hydride, such as sodium borohydride, to give predominantly the corresponding 6β,11β-diols (XVII; Y=R³=β-OH) and in smaller amounts the corresponding 6α,11β-diols (XVII; Y=β-OH, R³=α-OH). The Δ5-11-keto compound (XIII; Y=keto), upon reduction under the same conditions, affords the corresponding 11β-alcohol (XIII; Y=β-OH).

The 17,20;20,21-bismethylenedioxy group of the above compounds (XIII, XVII) is hydrolyzed conventionally with an acid, such as formic acid, preferably at steam bath temperature for approximately 1 hour, thus producing the corresponding 17α,21-dihydroxy-20-keto compounds (XIV, XVIII).

The compounds of the present invention having a primary and/or a secondary hydroxyl group, are conventionally acylated in pyridine with a suitable acylating agent, such as a chloride or an anhydride of a hydrocarbon carboxylic acid of the type defined hereinbefore, thus affording the corresponding acylates.

When there are present in the molecule a primary and a secondary hydroxyl group, the former may be selectively acylated by using approximately 1 molar equivalent of the acylating agent just described.

The compounds of the present invention having in the molecule a tertiary hydroxyl group, e.g., at C-17, are conventionally esterified in the presence of p-toluenesulfonic acid with an acylating agent, such as acetic anhydride, caproic anhydride, cyclopentylpropionic anhydride or enanthic anhydride, to produce the corresponding esters.

The following specific examples serve to illustrate but are not intended to limit the scope of the present invention.

PREPARATION 1

A solution of 1.1 equivalents of chromic acid in 5 cc. of 80% acetic acid was added dropwise to a stirred solution of 1 g. of the 3-acetate of 17,20;20,21-bismethylenedioxy-5α-bromo - 6β,19-oxido - pregnan - 3β - ol - 11-one (U.S.P. No. 3,065,228), in 10 cc. of glacial acetic acid, while the temperature was maintained around 90° C. After 3 hours at room temperature, the mixture was poured into ice water and the formed precipitate collected, washed with water and recrystallized from methanol, thus giving the 6,19-lactone of 3β-acetoxy-17,20;20, 21-bismethylenedioxy - 5α - bromo-pregnan-6β-ol-11-one-19-oic acid.

Example I

A mixture of 2 g. of the 6,19-lactone of the 3β,17β-diacetoxy - 5α - chloro - androstan-6β-ol-19-oic acid (obtained according to Berkoz et al., Steroids 1 (3), 251, 70 (1963), 2 g. of zinc powder, 1 g. of calcium carbonate, and 40 cc. of ethylene glycol was refluxed for 3 hours. It was then cooled and filtered. The filtrate was diluted with ethyl acetate and the resulting mixture was washed with water, dried and evaporated to dryness. The resulting residue was chromatographed on alumina and the solid fractions were recrystallized from acetone-hexane, thus yielding the 3,19-lactone of $\Delta^5$-androstene-3β,17β-diol-19-oic acid (Cpd. No. 1).

*Example II*

A mixture of 1 g. of compound No. 1, 4 cc. of pyridine and 2 cc. of acetic anhydride was kept at room temperature overnight, poured into ice water, the formed precipitate was filtered, washed with water and dried. Crystallization from acetone-hexane gave the 3,19-lactone of 17β-acetoxy-$\Delta^5$-androsten-3β-ol-19-oic acid (Cpd. No. 2).

*Example III*

A suspension of 5 g. of compound No. 2 in 50 cc. of dioxane was treated with 6 cc. of 1 N perchloric acid and then with 2 g. of N-bromoacetamide. The N-bromoacetamide was added portionwise, with stirring, in the course of 1 hour, in the dark and maintaining the temperature around 15° C. The mixture was stirred for 1 hour further in the dark room temperature and then decolorized by the addition of 10% aqueous sodium bisulfite solution. 1 lt. of water was added and the product was extracted with methylene chloride. The extract was washed with water, dried over anhydrous sodium sulfate and the solvent was evaporated under reduced pressure and at room temperature. Recrystallization from methylene-chloride-hexane furnished the 3,19-lactone of 17β-acetoxy-5α-bromo-androstane-3β,6β-diol-19-oic acid (Cpd. No. 3).

*Example IV*

A solution of 1 g. of compound No. 3 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave the 3,19-lactone of 17β-acetoxy-5α-bromo-androstan-3β-ol-6-one-19-oic acid (Cpd. No. 4).

*Example V*

A solution of 1 g. of compound No. 4, in 10 cc. of pyridine was refluxed for 6 hours. The reaction mixture was then poured into water, and the resulting precipitate collected by filtration, dried and recrystallized from acetone-hexane to give the 3,19-lactone of 17β-acetoxy-$\Delta^4$-androsten-3β-ol-6-one-19-oic acid (Cpd. No. 5).

*Example VI*

A suspension of 0.5 g. of 5% palladium on charcoal catalyst in 50 cc. of methanol was hydrogenated for 30 minutes. A solution of 2 g. of compound No. 5 in 200 cc. of methanol was added to the catalyst and stirred under a hydrogen atmosphere until the uptake of hydrogen ceased. After removal of the catalyst by filtration the solution was evaporated and the crude residue was purified by crystallization from methylene-chloride-hexane, thus giving the 3,19-lactone of 17β-acetoxy-androstan-3β-ol-6-one-19-oic acid (Cpd. No. 6).

*Example VII*

A solution of 2 g. of sodium borohydride in 30 cc. of methanol was added with stirring to a solution of 2 g. of compound No. 6 in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Alumina, chromatography of the residue followed by crystallization of the solid fractions from acetone-hexane gave predominantly the 3,19-lactone of 17β-acetoxy-androstane-3β,6β-diol-19-oic acid (Cpd. No. 7) and the 3,19-lactone of 17β-acetoxy-androstane-3β,6α-diol-19-oic acid (Cpd. No. 8) in smaller amount.

*Example VIII*

The compounds listed hereinafter under A (obtained according to my copending U.S. pat. appl. Ser. No. 236,724, filed Nov. 9, 1962, by chromic acid oxidation of the corresponding 6β,19-oxido compounds or according to Akhtar and Barton, J. Am. Chem. Soc., 84, 1496, (1962), from the corresponding 5α-bromo-6β-ol nitrites by phtolysis, followed by nitrous acid treatment and conventional oxidation) were treated according to the procedure described in Example I, thus yielding the corresponding products set forth under B.

| A | Cpd. No. | B |
|---|---|---|
| 6,19-lactone of the 3β-acetoxy-5α-bromo-pregnan-6β-ol-20-one-19-oic acid. | 9 | The 3,19-lactone of $\Delta^5$-pregnen-3β-ol-20-one-19-oic acid. |
| 6,19-lactone of the 3β,17α-diacetoxy-5α-bromo-pregnan-6β-ol-20-one-19-oic acid. | 10 | The 3,19-lactone of 17α-acetoxy-$\Delta^5$-pregnen-3β-ol-20-one-19-oic acid. |
| 6,19-lactone of the 3β-acetoxy-16α-methyl-5α-bromo-pregnan-6β-ol-20-one-19-oic acid. | 11 | The 3,19-lactone of 16α-methyl-$\Delta^5$-pregnen-3β-ol-20-one-19-oic acid. |
| 6,19-lactone of the 3β-acetoxy-16β-methyl-5α-bromo-pregnan-6β-ol-20-one-19-oic acid. | 12 | The 3,19-lactone of 16β-methyl-$\Delta^5$-pregnen-3β-ol-20-one-19-oic acid. |
| 6,19-lactone of the 3β-17α-diacetoxy-16α-methyl-5α-bromo-pregnan-6β-ol-20-one-19-oic acid. | 13 | The 3,19-lacetone of 17α-acetoxy-16α-methyl-$\Delta^5$-pregnen-3β-ol-20-one-19-oic acid. |
| 6,19-lactone of the 3β-acetoxy-16α,17α-isopropylidenedioxy-5α-bromo-pregnan-6β-ol-20-one-19-oic acid. | 14 | The 3,19-lactone of 16α,17α-isopropylidenedioxy-$\Delta^5$-pregnen-3β-ol-20-one-19-oic acid. |
| 6,19-lactone of 3β-acetoxy-5α-bromo-androstan-6β-ol-17-one-19-oic acid. | 15 | The 3,19-lactone of $\Delta^5$-androsten-3β-ol-17-one-19-oic acid. |
| 6,19-lactone of 3β-acetoxy-17α-methyl-5α-bromo-androstane-6β,17β-diol-19-oic acid. | 16 | The 3,19-lactone of 17α-methyl-$\Delta^5$-androstene-3β,17β-diol-19-oic acid. |
| 6,19-lactone of 3β-acetoxy-17α-vinyl-5α-bromo-androstane-6β,17β-diol-19-oic acid. | 17 | The 3,19-lactone of 17α-vinyl-$\Delta^5$-androstene-3β,17β-diol-19-oic acid. |
| 6,19-lactone of 3β-acetoxy-17β-ethinyl-5α-bromo-androstane-6β,17β-diol-19-oic acid. | 18 | The 3,19-lactone of 17α-ethinyl, $\Delta^5$-androstene-3β,17β-diol-19-oic acid. |

*Example IX*

The compounds Nos. 9 to 14, inclusive, were treated according to Example III, thus yielding respectively:
Cpd. No.:
 19. The 3,19-lactone of 5α-bromo-pregnane-3β,6β-diol-20-one-19-oic acid
 20. The 3,19-lactone of 5α-bromo-17α-acetoxy-pregnane-3β,6β-diol-20-one-19-oic acid
 21. The 3,19-lactone of 5α-bromo-16α-methyl-pregnane-3β,6β-diol-20-one-19-oic acid
 22. The 3,19-lactone of 5α-bromo-16β-methyl-pregnane-3β,6β-diol-20-one-19-oic acid
 23. The 3,19-lactone of 5α-bromo-17α-acetoxy-16α-methyl-pregnane-3β,6β-diol-20-one-19-oic acid
 24. The 3,19-lactone of 5α-bromo-16α,17α-isopropylidenedioxy-pregnane-3β,6β-diol-20-one-19-oic acid

*Example X*

A mixture of 5 g. of compound No. 19, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give the 3,19-lactone of 5α-bromo-20-cycloethylenedioxy-pregnane-3β,6β-diol-19-oic acid (Cpd. No. 25).

The latter compound was treated consecutively according to Examples IV and V, thus yielding respectively: the 3,19-lactone of 5α-bromo-20-cycloethylenedioxy-pregnan-3β-ol-6-one-19-oic acid (Cpd. No. 26) and the 3,19-lactone of 20-cycloethylenedioxy-Δ⁴-pregnen-3β-ol-6-one-19-oic acid (Cpd. No. 27).

The compounds Nos. 20 to 24, inclusive, were treated according to the same procedures, thus affording firstly the corresponding 20-ketals, secondly the corresponding 20-ketal-6-keto derivatives and finally, respectively:

Cpd. No.
28. The 3,19-lactone of 20-cycloethylenedioxy-17α-acetoxy-Δ⁴-pregnen-3β-ol-6-one-19-oic acid,
29. The 3,19-lactone of 20-cycloethylenedioxy-16α-methyl-Δ⁴-pregnen-3β-ol-6-one-19-oic acid,
30. The 3,19-lactone of 20-cycloethylenedioxy-16β-methyl-Δ⁴-pregnen-3β-ol-6-one-19-oic acid,
31. The 3,19-lactone of 20-cycloethylenedioxy-17α-acetoxy - 16α - methyl-Δ⁴-pregnen-3β-ol-6-one-19-oic acid,
32. The 3,19-lactone of 20-cycloethylenedioxy-16α,17α - isopropylidenedioxy-Δ⁴-pregnen-3β-ol-6-one-19-oic acid.

*Example XI*

The compounds Nos. 27 to 32, inclusive, were treated according to Example VI, thus yielding respectively:

Cpd. No.:
33. The 3,19-lactone of 20-cycloethylenedioxy-allopregnan-3β-ol-6-one-19-oic acid,
34. The 3,19-lactone of 20-cycloethylenedioxy-17α-acetoxy-allopregnan-3β-ol-6-one-19-oic acid,
35. The 3,19-lactone of 20-cycloethylenedioxy-16α-methyl-allopregnan-3β-ol-6-one-19-oic acid,
36. The 3,19-lactone of 20-cycloethylenedioxy-16β-methyl-allopregnan-3β-ol-6-one-19-oic acid,
37. The 3,19-lactone of 20-cycloethylenedioxy-17α-acetoxy - 16α - methyl-allopregnan-3β-ol-6-one-19-oic acid,
38. The 3,19-lactone of 20-cycloethylenedioxy-16α,17α - isopropylidenedioxy-allopregnan-3β-ol-6-one-19-oic acid.

*Example XII*

The compounds Nos. 27 to 38, inclusive, were treated according to Example VII thus affording predominantly the following respective compounds:

Cpd. No.:
39. The 3,19-lactone of 20-cycloethylenedioxy-Δ⁴-pregnene-3β,6β-diol-19-oic acid,
40. The 3,19-lactone of 20-cycloethylenedioxy-17α-acetoxy-Δ⁴-pregnene-3β,6β-diol-19-oic acid,
41. The 3,19-lactone of 20-cycloethylenedioxy-16α-methyl-Δ⁴-pregnene-3β,6β-diol-19-oic acid,
42. The 3,19-lactone of 20-cycloethylenedioxy-16β-methyl-Δ⁴-pregnene-3β,6β-diol-19-oic acid,
43. The 3,19-lactone of 20-cycloethylenedioxy-17α-acetoxy - 16α - methyl-Δ⁴-pregnene-3β,6β-diol-19-oic acid,
44. The 3,19-lactone of 20-cycloethylenedioxy-16α,17α - isopropylidenedioxy-Δ⁴-pregnene-3β,6β-diol-19-oic acid,
45. The 3,19-lactone of 20-cycloethylenedioxy-allopregnane-3β,6β-diol-19-oic acid,
46. The 3,19-lactone of 20-cylcoethylenedioxy-17α-acetoxy-allopregnane-3β,6β-diol-19-oic acid,
47. The 3,19-lactone of 20-cycloethylenedioxy-16α-methyl-allopregnane-3β,6β-diol-19-oic acid,
48. The 3,19-lactone of 20-cycloethylenedioxy-16β-methyl-allopregnane-3β,6β-diol-19-oic acid,
49. The 3,19-lactone of 20-cycloethylenedioxy-17α-acetoxy - 16α-methyl-allopregnane-3β,6β-diol-19-oic acid,
50. The 3,19-lactone of 20-cycloethylenedioxy-16α,17α - isopropylidenedioxy-allopregnane-3β,6β-diol-19-oic acid and in smaller amount the corresponding 6α-isomers thereof.

*Example XIII*

A solution of 2.0 g. of compound No. 27 in 70 cc. of methanol and 7 ml. of 8% aqueous sulfuric acid was refluxed for 40 minutes. It was then neutralized with saturated sodium carbonate solution, concentrated to ca. 20 ml. in vacuo and poured into water. The formed precipitate was filtered off and washed thoroughly with water. Recrystallization from acetone gave the 3,19-lactone of Δ⁴ - pregnen - 3β - ol - 6,20 - dione - 19 - oic acid (Cpd. No. 51).

The compounds Nos. 28 to 50, inclusive, were treated by the same procedure, thus affording respectively:

Cpd. No.:
52. The 3,19-lactone of 17α-acetoxy-Δ⁴-pregnen-3β-ol-6,20-dione-19-oic acid,
53. The 3,19-lactone of 16α-methyl-Δ⁴-pregnen-3β-ol-6,20-dione-19-oic acid,
54. The 3,19-lactone of 16β-methyl-Δ⁴-pregnen-3β-ol-6,20-dione-19-oic acid,
55. The 3,19-lactone of 17α-acetoxy-16α-methyl-Δ⁴-pregnen-3β-ol-6,20-dione-19-oic acid,
56. The 3,19-lactone of 16α,17α-isopropylidenedioxy-Δ⁴-pregnen-3β-ol-6,20-dione-19-oic acid,
57. The 3,19 - lactone of allopregnan - 3β-ol-6,20-dione-19-oic acid,
58. The 3,19-lactone of 17α-acetoxy-allopregnan-3β-ol-6,20-dione-19-oic acid,
59. The 3,19-lactone of 16α-methyl-allopregnan-3β-ol-6,20-dione-19-oic acid,
60. The 3,19-lactone of 16β-methyl-allopregnan-3β-ol-6,20-dione-19-oic acid,
61. The 3,19-lactone of 17α-acetoxy-16α-methyl-allopregnan-3β-ol-6,20-dione-19-oic acid,
62. The 3,19-lactone of 16α,17α-isopropylidenedioxy-allopregnan-3β-ol-6,20-dione-19-oic acid,
63. The 3,19-lactone of Δ⁴-pregnene-3β,6β-diol-20-one-19-oic acid,
64. The 3,19-lactone of 17α-acetoxy-Δ⁴-pregnene-3β,6β-diol-20-one-19-oic acid,
65. The 3,19-lactone of 16α-methyl-Δ⁴-pregnene-3β,6β-diol-20-one-19-oic acid,
66. The 3,19-lactone of 16β-methyl-Δ⁴-pregnene-3β,6β-diol-20-one-19-oic acid,
67. The 3,19-lactone of 17α-acetoxy-16α-methyl-Δ⁴-pregnene-3β,6β-diol-20-one-19-oic acid,
68. The 3,19-lactone of 16α,17α-isopropylidenedioxy-Δ⁴-pregnene-3β,6β-diol-20-one-19-oic acid,
69. The 3,19-lactone of allopregnane-3β,6β-diol-20-one-19-oic acid,
70. The 3,19-lactone of 17α-acetoxy-allopregnane-3β,6β-diol-20-one-19-oic acid,
71. The 3,19-lactone of 16α-methyl-allopregnane-3β,6β-diol-20-one-19-oic acid,
72. The 3,19-lactone of 16β-methyl-allopregnane-3β,6β-diol-20-one-19-oic acid,
73. The 3,19 - lactone of 17α-acetoxy-16α-methyl-allopregnane-3β,6β-diol-20-one-19-oic acid,
74. The 3,19-lactone of 16α,17α-isopropylidenedioxy-allopregnane-3β,6β-diol-20-one-19-oic acid.

*Example XIV*

The compound No. 5 was treated according to Example VII, thus yielding predominantly the 3,19-lactone of 17β-acetoxy-Δ⁴-androstene - 3β,6β - diol -19 - oic acid (Cpd. No. 75) and in smaller amount the 3,19-lactone of 17β-acetoxy-Δ⁴-androstene-3β,6α-diol-19-oic acid (Cpd. No. 76).

*Example XV*

The compound No. 16 was successively treated according to Examples III, IV, V and VI, thus yielding respectively:

Cpd. No.:
77. The 3,19-lactone of 5α-bromo-17α-methyl-androstane-3β,6β,17β-triol-19-oic acid,
78. The 3,19-lactone of 5α-bromo-17α-methyl-androstane-3β,17β-diol-6-one-19-oic acid,
79. The 3,19-lactone of 17α-methyl-Δ⁴-androstene-3β,17β-diol-6-one-19-oic acid,
80. The 3,19-lactone of 17α-methyl-androstane-3β,17β-diol-6-one-19-oic acid.

*Example XVI*

The compounds Nos. 79 and 80 were treated according to Example VII, thus giving respectively and predominantly: The 3,19-lactone of 17α-methyl-Δ⁴-androstene-3β,6β,17β - triol - 19 - oic acid (Cpd. No. 81) and the 3,19 - lactone of 17α - methyl - androstane - 3β,6β,17β-triol - 19 - oic acid (Cpd. No. 82), and in smaller amounts the 6α-isomers thereof.

*Example XVII*

The 6,19 - lactone of 3β - acetoxy - 17,20;20,21-bis-methylenedioxy - 5α - bromo - pregnan - 6β - ol - 11 - one-19-oic acid, obtained according to Preparation 1, was treated successively in accordance with Examples I, III, IV, V and VI thus yielding respectively:

Cpd. No.:
83. The 3,19-lactone of 17,20;20,21-bismethylenedioxy-Δ⁵-pregnene-3β-ol-11-one-19-oic acid,
84. The 3,19-lactone of 17,20;20,21-bismethylenedioxy-5α-bromo-pregnane-3β,6β-diol - 11 - one-19-oic acid,
85. The 3,19-lactone of 17,20;20,21-bismethylenedioxy-5α-bromo-pregnane-3β-ol-6,11 - dione - 19-oic acid,
86. The 3,19-lactone of 17,20;20,21-bismethylenedioxy-Δ⁴-pregnen-3β-ol-6,11-dione-19-oic acid,
87. The 3,19-lactone of 17,20;20,21-bismethylenedioxy-allopregnan-3β-ol-6,11-dione-19-oic acid.

*Example XVIII*

The compounds Nos. 83, 86 and 87, were treated according to Example VII, thus giving respectively:

Cpd. No.:
88. The 3,19-lactone of 17,20;20,21-bismethylenedioxy-Δ⁵-pregnene-3β-11β-diol-19-oic acid,
89. The 3,19-lactone of 17,20;20,21-bismethylenedioxy-Δ⁴-pregnene-3β,6β,11β-triol-19-oic acid (predominantly, and in smaller amount the 6α-isomer thereof),
90. The 3,19-lactone of 17,20;20,21-bismethylenedioxy-allopregnane-3β,6β,11β-triol-19-oic acid (predominantly and in smaller amount the 6α-isomer thereof).

*Example XIX*

1 g. of compound No. 83 was heated on the steam bath with 20 cc. of 60% formic acid for 1 hour, cooled, diluted with water and the precipitate was collected, washed with water, dried, and recrystallized from acetone-hexane, thus affording the 3,19-lactone of Δ⁵-pregnene-3β,17α,21-triol-11,20-dione-19-oic acid (Cpd. No. 91).

The compounds Nos. 86 to 90, inclusive, were treated by the same procedure, thus furnishing respectively:

Cpd. No.:
92. The 3,19-lactone of Δ⁴-pregnene-3β,17α,21-triol-6,11,20-trione-19-oic acid,
93. The 3,19-lactone of allopregnane-3β,17α,21-triol-6,11,20-trione-19-oic acid,
94. The 3,19-lactone of Δ⁵-pregnene-3β,11β,17α,21-tetrol-20-one-19-oic acid,
95. The 3,19-lactone of Δ⁴-pregnene-3β,6β,11β,17α,21-pentol-20-one-19-oic acid,
96. The 3,19-lactone of allopregnan-3β,6β,11β,17α,21-pentol-20-one-19-oic acid.

When treating the 6α-isomers of compounds Nos. 89 and 90 by the same procedure, there were obtained the 6α-isomers of compounds Nos. 95 and 96.

*Example XX*

A solution of 500 mg. of compound No. 5 in 25 cc. of acetone and 5 cc. of water was treated with 1 cc. of concentrated hydrochloric acid and the mixture boiled under reflux for 10 minutes, then kept at room temperature for 52 hours. It was then poured into water, extracted with methylene chloride and the organic extract washed with water to neutral, dried over anhydrous sodium sulfate and evaporated to dryness. Crystallization from acetone-hexane gave the 3,19-lactone of Δ⁴-androstene-3β,17β-diol-6-one-19-oic acid (Cpd. No. 97).

Upon treatment of compounds Nos. 6, 7, 8, 75 and 76 by the same procedure, there were produced the corresponding 17β-free alcohols.

*Example XXI*

A solution of 0.17 g. of potassium hydroxide in 0.2 cc. of water and 2.5 cc. of methanol was added over 30 minutes to a boiling solution of 1 g. of compound No. 10 in 30 cc. of methanol under an atmosphere of nitrogen. Boiling was continued for a further 2 hours and the solution was then cooled, acidified with hydrochloric acid and concentrated under reduced pressure. Addition of water, followed by methylene chloride extraction and crystallization of the residue from acetone-hexane, produced the 3,19-lactone of Δ⁵-pregnene-3β,17α-diol-20-one-19-oic acid (Cpd. No. 98).

The compounds Nos. 13, 52, 55, 58, 61, 64, 67, 70, and 73 were treated by the same procedure, thus giving the corresponding 17α-free alcohols.

*Example XXII*

The compounds Nos. 91 to 94, inclusive, were treated according to Example II, thus yielding the corresponding 21-acetates.

*Example XXIII*

The compounds Nos. 95 and 96, were treated according to Example II, except that there were only used 1.1 equivalents of acetic anhydride, thus yielding the corresponding 21-acetates.

*Example XXIV*

The compounds Nos. 91 to 94, were treated according to Example II, except that acetic anhydride was substituted by caproic anhydride, enanthic anhydride and undecenoic anhydride, thus furnishing respectively the corresponding 21-caproates, 21-enanthates and 21-undecenoates.

*Example XXV*

The compounds Nos. 95 and 96 were treated according to Example XXIII, except that acetic anhydride was substituted by caproic anhydride and undecenoic anhy-

13 dride, thus yielding respectively the corresponding 21-caproates and 21-undecenoates.

*Example XXVI*

To a solution of 5 g. of compound No. 16 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the 3,19-lactone of 17β-caproxy-17α-methyl-Δ⁵-androsten-3β-ol-19-oic acid (Cpd. No. 99).

The compounds Nos. 17, 18, 79 and 80 were treated by the above procedure, thus giving respectively:

Cpd. No.:
    100. The 3,19-lactone of 17β-caproxy-17α-vinyl-Δ⁵-androsten-3β-ol-19-oic acid,
    101. The 3,19-lactone of 17β-caproxy-17α-ethinyl-Δ⁵-androsten-3β-ol-19-oic acid,
    102. The 3,19-lactone of 17β-caproxy-17α-methyl-Δ⁴-androsten-3β-ol-6-one-19-oic acid,
    103. The 3,19-lactone of 17β-caproxy-17α-methyl-androstane-3β-ol-6-one-19-oic acid.

*Example XXVII*

The compounds Nos. 102 and 103 were treated according to Example VII, thus giving respectively and predominantly: The 3,19-lactone of 17β-caproxy-17α-methyl-Δ⁴-androstene-3β,6β - diol-19 - oic acid (Cpd. No. 104), and the 3,19-lactone of 17β-caproxy-17α-methyl-androstene-3β,6β-diol-19-oic acid (Cpd. No. 105), and in smaller amounts the 6α-isomers thereof.

*Example XXVIII*

The 17α-free alcohols obtained according to Example XXI from compounds Nos. 13, 52, 55, 58 and 61 were treated following the procedure described in Example XXVI, thus yielding the corresponding 17-caproates.

*Example XXIX*

The compounds Nos. 14, 56, 62, 68 and 74 were treated according to Example XIX, thus giving respectively:

Cpd. No.:
    106. The 3,19-lactone of Δ⁵ - pregnene - 3β,16α,17α-triol-20-one-19-oic acid,
    107. The 3,19-lactone of Δ⁴ - pregnene - 3β,16α,17α-triol-6,20-dione-19-oic acid,
    108. The 3,19-lactone of allopregnane - 3β,16α,17α-triol-6,20-dione-19-oic acid,
    109. The 3,19-lactone of Δ⁴ - pregnene - 3β,16α,17α-tetrol-20-one-19-oic acid,
    110. The 3,19-lactone of allopregnane-3β,6β,16α,17α-tetrol-20-one-19-oic acid.

I claim:
1. A compound of the following formula:

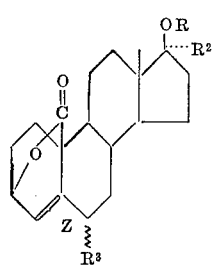

wherein R is selected from the group consisting of hydrogen and a hydrocarbon carboxylic acyl group of less than 12 carbon atoms; $R^2$ is selected from the group consisting of hydrogen and lower alkyl; $R^3$ is selected from the group consisting of hydroxyl and keto; and Z is a member of the group consisting of a double bond and a saturated linkage, each between C–4 and C–5.

2. A compound of the following formula:

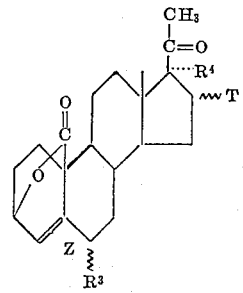

wherein $R^4$ is selected from the group consisting of hydrogen, hydroxyl and a hydrocarbon carboxyl acyloxy group of less than 12 carbon atoms; T is a member of the group consisting of hydrogen, α-methyl, β-methyl, and α-hydroxyl; $R^4$ and T together form from the group

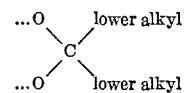

in the 16α,17α-position; $R^3$ is selected from the group consisting of hydroxyl and keto; and Z is a member of the group consisting of a double bond and a saturated linkage each between C–4 and C–5.

3. A compound of the following formula:

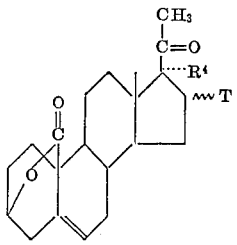

wherein $R^4$ is selected from the group consisting of hydrogen, hydroxyl and a hydrocarbon carboxylic acyloxy group of less than 12 carbon atoms; and T is a member of the group consisting of hydrogen, α-methyl, β-methyl, and α-hydroxyl; $R^4$ and T together form the group

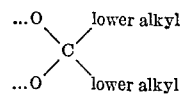

in the 16α,17α-position.

4. A compound of the following formula:

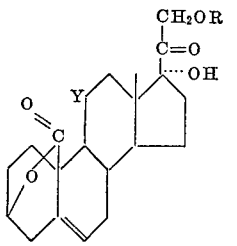

wherein R is selected from the group consisting of hydrogen and a hydrocarbon carboxylic acyl group of less than 12 carbon atoms; and Y is a member of the group consisting of keto and B-hydroxyl.

5. A compound of the following formula:

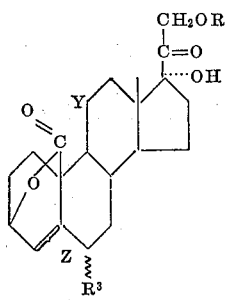

wherein R is selected from the group consisting of hydrogen and a hydrocarbon carboxylic acyl group of less than 12 carbon atoms; Y is a member of the group consisting of keto and β-hydroxyl; $R^3$ is selected from the group consisting of hydroxyl and keto; and Z is a member of the group consisting of a double bond and a saturated linkage, each between C-4 and C-5.

6. The 3,19-lactone of 17β-acetoxy-Δ⁴-androsten-3β-ol-6-one-19-oic acid.

7. The 3,19-lactone of Δ⁵-pregnen-3β-ol-20-one-19-oic acid.

8. The 3,19-lactone of 17α-acetoxy-Δ⁵-pregnen-3β-ol-20-one-19-oic acid.

9. The 3,19,lactone of 16α-methyl-Δ⁵-pregnen-3β-ol-20-one-19-oic acid.

10. The 3,19-lactone of 16β-methyl-Δ⁵-pregnen-3β-ol-20-one-19-oic acid.

11. The 3,19-lactone of 17α-acetoxy-16α-methyl-Δ⁵-pregnen-3β-ol-20-one-19-oic acid.

12. The 3,19-lactone of 16α,17α-isopropylidenedioxy-Δ⁵-pregnen-3β-ol-20-one-19-oic acid.

13. The 3,19-lactone of Δ⁴-pregnen-3β-ol-6,20,dione-19-oic acid.

14. The 3,19-lactone of Δ⁵-pregnen-3β-17α,21 - triol-11,20-dione-19-oic acid.

15. The 3,19-lactone of Δ⁴-pregnene-3β,17α-21-triol-6,11,20-trione-19-oic acid.

References Cited by the Examiner
UNITED STATES PATENTS 3,141,016   7/1964   Wettstein et al. _____ 260—239.55

OTHER REFERENCES

Berkoz et al.: Steroids, vol. 1, No. 3, pages 251–70, March 1963.

Gardi et al.: Gazz. Chim. Ital., pages 1420–30 (1961).

LEWIS GOTTS, *Primary Examiner.*

UNITED STATES PATENT OFFICE
CERTIFICATE OF CORRECTION

Patent No. 3,223,702                        December 14, 1965

Albert Bowers

It is hereby certified that error appears in the above numbered patent requiring correction and that the said Letters Patent should read as corrected below.

Column 14, line 25, strike out "from"; line 75, for "B-hydroxyl" read -- β-hydroxyl --.

Signed and sealed this 20th day of September 1966.

(SEAL)
Attest:

ERNEST W. SWIDER                        EDWARD J. BRENNER
Attesting Officer                                Commissioner of Patents